United States Patent
Durrant et al.

(10) Patent No.: US 7,292,905 B1
(45) Date of Patent: Nov. 6, 2007

(54) METHOD AND SYSTEM FOR IDENTIFYING MANUFACTURING ANOMALIES IN A MANUFACTURING SYSTEM

(75) Inventors: Douglas J. Durrant, Mission Viejo, CA (US); Bruce E. Aldridge, Oceanside, CA (US); Ross E. Gough, Foothill Ranch, CA (US)

(73) Assignee: NCR Corp., Dayton, OH (US)

( * ) Notice: Subject to any disclaimer, the term of this patent is extended or adjusted under 35 U.S.C. 154(b) by 0 days.

(21) Appl. No.: 09/541,137

(22) Filed: Mar. 31, 2000

(51) Int. Cl.
*G06F 19/00* (2006.01)
(52) U.S. Cl. .................. 700/108; 700/115; 702/182
(58) Field of Classification Search .............. 700/52, 700/110, 117, 103, 109, 115, 108; 702/182; 707/5
See application file for complete search history.

(56) References Cited

U.S. PATENT DOCUMENTS

| | | | | |
|---|---|---|---|---|
| 4,509,123 A * | 4/1985 | Vereen | ...... | 700/130 |
| 5,442,545 A | 8/1995 | Matsui et al. | ...... | 705/29 |
| 5,491,637 A | 2/1996 | Kraemer et al. | ...... | 700/115 |
| 5,787,425 A * | 7/1998 | Bigus | ...... | 707/6 |
| 5,889,674 A | 3/1999 | Burdick et al. | ...... | 700/121 |
| 5,978,751 A | 11/1999 | Pence et al. | ...... | 702/179 |
| 6,301,517 B1 * | 10/2001 | Doran et al. | ...... | 700/110 |
| 6,381,509 B1 | 4/2002 | Thiel et al. | ...... | 700/115 |
| 6,381,556 B1 * | 4/2002 | Kazemi et al. | ...... | 702/182 |
| 6,424,876 B1 * | 7/2002 | Cusson et al. | ...... | 700/108 |
| 6,438,438 B1 * | 8/2002 | Takagi et al. | ...... | 700/121 |
| 6,446,017 B1 * | 9/2002 | Skidmore | ...... | 702/81 |
| 6,574,522 B1 * | 6/2003 | Douglas | ...... | 700/109 |
| 6,615,096 B1 * | 9/2003 | Durrant et al. | ...... | 700/115 |

* cited by examiner

*Primary Examiner*—Leo Picard
*Assistant Examiner*—Sheela Rao
(74) *Attorney, Agent, or Firm*—Lyon & Lyon, LLP; James M. Stover

(57) ABSTRACT

A method and system for identifying manufacturing anomalies in a manufacturing system comprising a plurality of products which are manufactured with a plurality of manufacturing parameters is disclosed. The system comprises a data mining program applied to the data warehouse for analyzing the stored manufacturing parameters to define a normal manufacturing parameter subset. The data mining program is further for detecting that at least one of the plurality of manufacturing parameters is excluded from the normal subset. The system further comprises a reporting means for reporting the at least one detected manufacturing parameter. The data mining program may further detect that a plurality of the manufacturing parameters are excluded from the first subset. The data mining program then analyzes the detected plurality of manufacturing parameters to define a second normal subset of the detected plurality of manufacturing parameters. The reporting means may then report the second normal subset of manufacturing parameters.

12 Claims, 7 Drawing Sheets

METHOD AND SYSTEM FOR IDENTIFYING MANUFACTURING ANOMALIES IN A MANUFACTURING SYSTEM

BACKGROUND OF THE INVENTION

1. Field of the Invention

The invention relates to a method for identifying manufacturing anomalies in a manufacturing system comprising a plurality of products which are manufactured with a plurality of manufacturing attributes. More specifically, the invention comprises a method and system for using data-mining techniques to define normality for product performance, and to identify anomalies for manufacturing parameters excluded from the defined normality based on product performance.

2. Description of the Prior Art and Related Information

Today's ever smaller manufactured products may comprise multitudes of components which are assembled in manufacturers' manufacturing facilities. In order to secure steady supplies and obtain lower pricing on components, manufacturers of the products may use a plurality of sources for the components. Such a diversification technique may include receiving different groups, or lots, of the same component from different manufacturers to be included in the same product line or model.

Typically, components are shipped from the component suppliers in lots that have similar component manufacturing parameters. Such parameters may comprise, for example, direct parameters such as the tolerance of a lot of resistors, the threshold of a lot of resistors, the capacitance of a lot of capacitors, the reactance of a log of capacitors; or indirect parameters such as the specific supplier from which a particular lot originated; the shipping method used for transporting the lot to the product manufacturer, or the time of year (date code) that the lot of components were manufactured. Such direct parameters may cause a variation in the quality, reliability or performance of a particular lot of components, thereby causing a variation in the performance of the assembled product. Further, correlation may exist between a variation in performance and indirect parameters. Further, there may be certain interactions between parameters that may lead to variations in performance. Such variations may be positive or negative influences on product performance.

The lots are typically identified by a lot number, called a component identifier herein, which identifies the lot to the product manufacturer and the supplier, the component identifier usually being used for accounting purposes or traceability to manufacturing parameters of the lot. However, especially with small electronic components, the component identifiers themselves may not be imprinted or bar-coded on the components themselves due to practical considerations such as component size, or the extra time and expense in manufacturing that would be required to do so. Therefore, once the components leave their packing materials in which they were shipped, the lot from which those components came from may not be able to be identified.

Certain lots of components may be in some way defective or vary in their performance due to the different manufacturing conditions referenced above, or due to a certain component supplier's neglect or breach in promise to supply a certain quality of components. One solution that has been employed heretofore is for the manufacturer to test statistically significant numbers of components from each lot as they arrive from the individual suppliers. However, with products that are sold for low profit margins, such testing and delay in product assembly has become untenable. More and more product manufacturers have been forced to rely on component suppliers' representations that the supplied components meet the standards set by the product manufactures, or that the supplied components fall within a set standard deviation of performance within each lot. Such reliance has proven inadequate in countless situations, with many product manufactures having their products show variations in performance when it is too late to trace the suspect components back to the lot from which they came.

Still, apart from the components themselves, there may be product manufacturing parameters which may be responsible for variations in performance in products. For example, the temperature or humidity of a factory where the components are assembled into the products may be a contributing factor to product performance. Other product manufacturing parameters such as the assembly line or conveyor belt speed my further affect product performance.

Solutions to the above problems are described in U.S. patent application Ser. No. 09/494,175, filed Jan. 31, 2000, entitled METHOD USING STATISTICALLY ANALYZED PRODUCT TEST DATA TO CONTROL COMPONENT MANUFACTURING PROCESS which is hereby incorporated by reference herein. That application provides for a plurality of analytical tools for identifying correlations between products which show variations in performance and product or component manufacturing parameters. Typical analytical tools which are described in the system of that application include statistical data tools, a data visualization tool, a data-mining tool, an on-line analytical processing (OLAP) tool, an information broadcast tool or some combination thereof. However, typical analytical tools require that the operator of such tools have a working knowledge of which manufacturing parameters may cause product performance to suffer. The programmer is then required to program the operation of a particular analytical tool based on predicted manufacturer parameter anomalies. As a result, unpredictable anomalies may thus go undetected, or may be difficult to pinpoint.

Finally, it is often difficult to ascertain normal operation of a product relative to a manufacturing parameter as compared with anomalous operation. This is especially so with respect to multi-variant manufacturing parameters which may have anomalies in one or more of several performance measure dimensions. For example, one or more configurations of a disk drive head assembly may have anomalous operation with respect to seek time while having a relatively low error rate and normal servo tracking. Given that other head assembly configurations may show anomalous performance in seek time, error rate or servo tracking, defining just what is normal operation can be difficult, much less identifying anomalous operation.

Thus, there is a need for a system and method for defining normal operation in product performance with respect to manufacturing parameters in multiple dimensions. There is further a need for a system and method for identifying unpredicted or unpredictable manufacturing anomalies.

SUMMARY OF THE INVENTION

A method and system for identifying manufacturing anomalies in a manufacturing system comprising a plurality of products which are manufactured with a plurality of manufacturing parameters is disclosed. The system comprises a data mining program applied to the data warehouse for analyzing the stored manufacturing parameters to define a normal manufacturing parameter subset. The data mining program is further for detecting that at least one of the plurality of manufacturing parameters is excluded from the normal subset. The system further comprises a reporting means for reporting the at least one detected manufacturing parameter.

The data mining program may further detect that a plurality of the manufacturing parameters are excluded from the first subset. The data mining program then analyzes the detected plurality of manufacturing parameters to define a second normal subset of the detected plurality of manufacturing parameters. The reporting means may then report the second normal subset of manufacturing parameters.

The data mining program defines a normal subset by first classifying performance variables in n-dimensional space. The manufacturing parameters are plotted against various performance values. The data mining program defines one or more performance clusters, or subsets, of parameters of products which show similar performance ratings in the n-dimensional space. The data mining program is then able to detect parameters which fall outside the groups, thereby defining an anomaly in performance for that parameter.

DETAILED DESCRIPTION OF THE PREFERRED EMBODIMENTS

Figure 1:
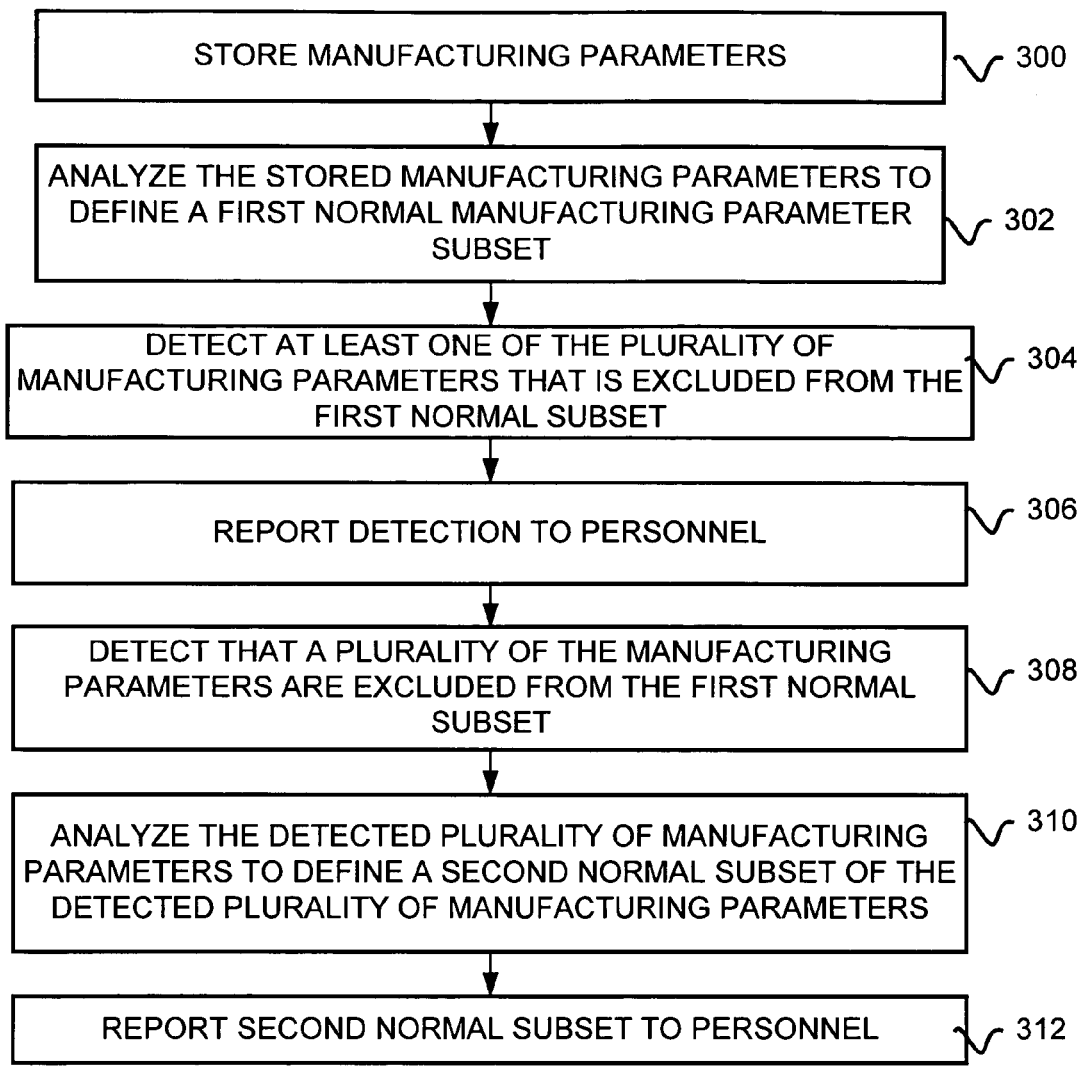
FIG. 1 is a flow diagram illustrating the steps performed by the system of the present invention.

With reference to FIG. 1, a flow diagram illustrating the steps performed in a method for identifying manufacturing anomalies in a plurality of products which are manufactured with a plurality of manufacturing parameters in a manufacturing system described in FIG. 2 referenced below is shown. The plurality of manufacturing parameters (20 in FIG. 2) are stored in the data warehouse (56 in FIG. 2) step 300. A data mining program (54 in FIG. 2) is applied to analyze the stored manufacturing parameters 20 to define a first normal manufacturing parameter subset (102 in FIG. 3 described below), step 302. The first normal subset 102 is defined by categorizing the manufacturing parameters 20 in n-dimensional space (100 in FIG. 3). The data mining program 54 detects at least one of the plurality of manufacturing parameters 20 that is excluded from the first normal subset 102 in the n-dimensional space 100, step 304. The detection of the at least one manufacturing parameter 20 is then reported to personnel through a notification system (70 in FIG. 2), step 306.

The data mining program 54 may detect that a plurality of the manufacturing parameters 20 are excluded from the first normal subset 102, step 308. In this case, the data mining program 54 may analyze the detected plurality of manufacturing parameters 20 to define a second normal subset (106 in FIG. 3) of the detected plurality of manufacturing parameters 20, step 110. The second normal subset 106 is defined by the data mining program 54 by categorizing the manufacturing parameters 20 excluded from the first normal subset 102 in the n-dimensional space 100. The notification system 70 then reports the second normal subset 106 of manufacturing parameters 20 to personnel, step 312.

Figure 2:
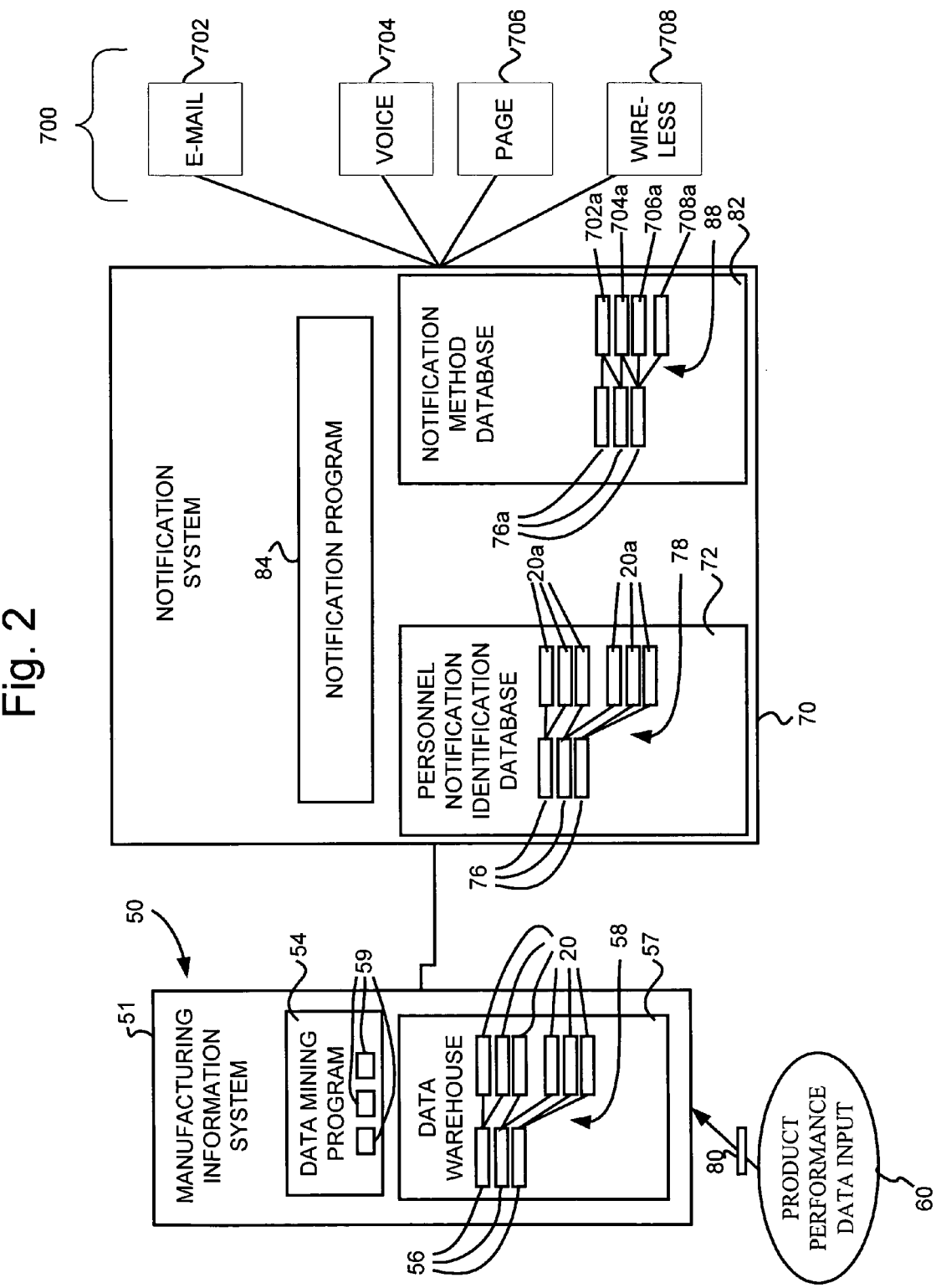
FIG. 2 is a block diagram showing an exemplary structure of a system that performs the method illustrated in FIG. 1.

With reference to FIG. 2, an exemplary structure of the system for identifying manufacturing anomalies in a manufacturing system is shown. The system includes a manufacturing information system 51 for a manufacturer 50 such as the above-referenced U.S. patent application Ser. No. 09/494,175 entitled METHOD USING STATISTICALLY ANALYZED PRODUCT TEST DATA TO CONTROL COMPONENT MANUFACTURING PROCESS. The system includes a data warehouse 57 for storing product identifiers 56 identifying products having manufacturing parameters 20 and values representing the manufacturing parameters 20. The manufacturing parameters 20 may comprise product manufacturing parameters and/or component manufacturing parameters.

A data mining program 54 is applied to the data warehouse for analyzing the stored manufacturing parameters 20 to define the first normal subset 102 of manufacturing parameters 20. The data mining program 54 detects that at least one of the manufacturing parameters 20 is excluded from the normal subset 102.

A reporting means, comprising a notification system 70, is included for reporting the at least one detected manufacturing parameter 20 to personnel.

A relational means 58 is provided in the data warehouse for relating the manufacturing parameters 20 with particular product identifiers 56 for products that have the related manufacturing parameters 20. The relational means 58 may comprise an RDBMS system such as that produced by ORACLE Systems of Redwood Shores, Calif. or by NCR of Dayton, Ohio.

The system includes a means for receiving 60 product performance data 80, wherein the performance data 80 includes product identifier data for matching with the product identifiers 56 in the data warehouse 57. The means for receiving 60 may comprise a data terminal and keyboard, personal computer or failure analysis test equipment for receiving data from failed products.

The data mining program 54 is applied to the data warehouse 57 for defining a normal subset by first classifying performance variables in n-dimensional space as described with respect to FIG. 3 below. The manufacturing parameters 20 are plotted against various performance values. The data mining program 54 defines one or more performance clusters, or subsets (102-106 in FIG. 3), of manufacturing parameters 20 of products which show similar performance ratings in the n-dimensional space. The data mining program 54 is then able to detect manufacturing parameters 20 which fall outside, or are excluded from, a subset 102, thereby defining an anomaly in performance for that manufacturing parameter 20. Further, a new subset 106 may be defined by the data mining program 54 from performance clusters defined by a plurality of manufacturing parameters 20 excluded from the first normal subset 102.

The data mining computer program 54 may comprise a plurality of data mining sub-routines 59 for executing. One or more of the sub-routines 59 may be executed to define one or more first normal subsets 102 of the manufacturing parameters 20. Another data mining sub-routine 59 may be used to detect that one or more parameters 20 fall outside the one or more normal subsets. Another sub-routine 59 may be executed for analyzing the detected manufacturing parameters 20 to define new normal subsets 106 from the detected plurality of manufacturing parameters 20. Each sub-routine 59 may be divided between a plurality of executable files for executing against the data warehouse 57.

Figure 3:
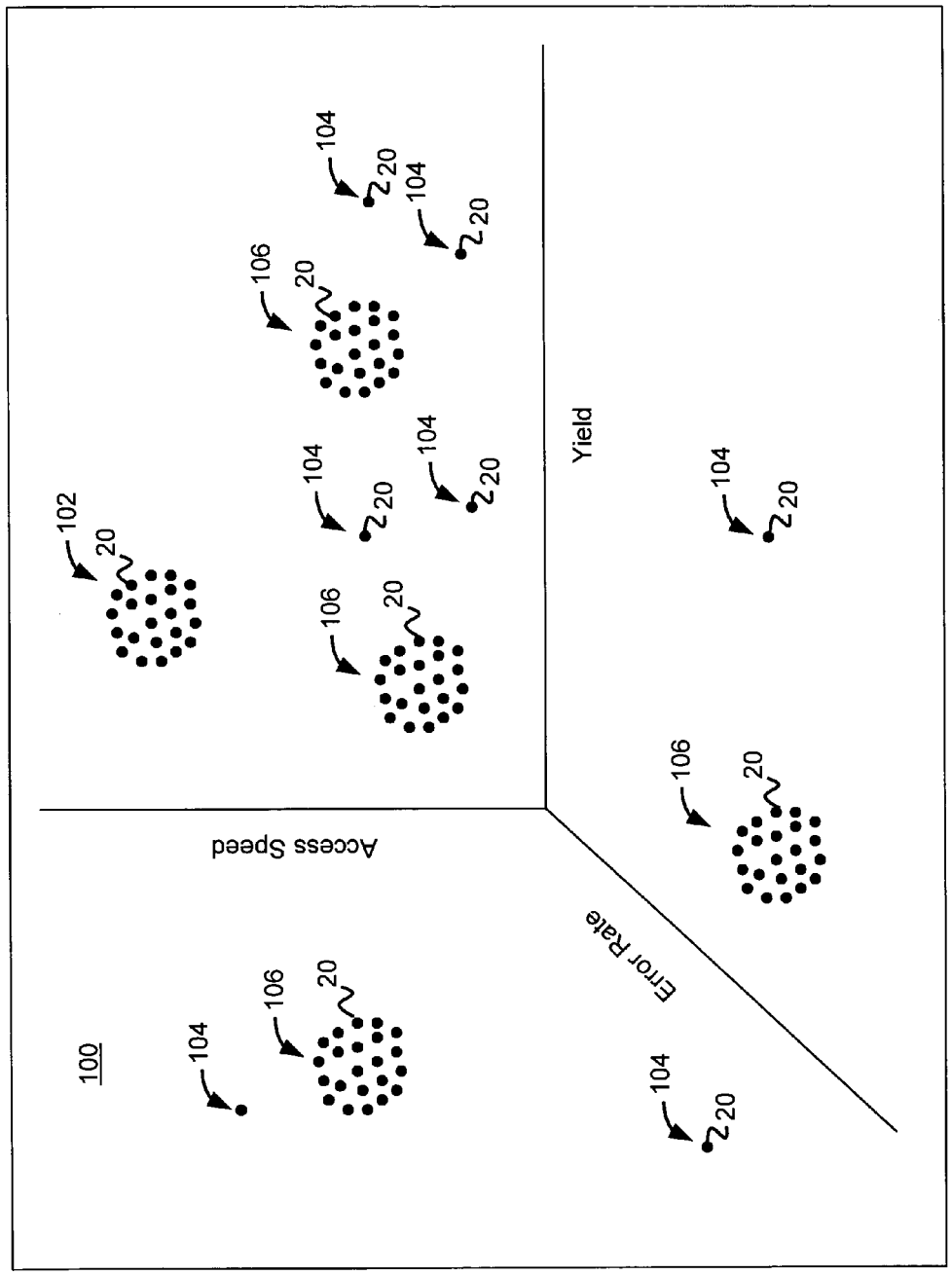
FIG. 3 is a simplified n-dimensional space plot of manufacturing parameters based on product performance produced by the data mining program of the system of FIG. 2.

With reference to FIG. 3, a simplified plot in n-dimensional space 100 of manufacturing parameters 20 based on product performance produced by the data mining program 54 of the method of FIG. 1 and system of FIG. 2 is shown. For the n-dimensional space 100 of FIG. 3, n=3 in order to simplify the diagram for illustrative purposes. The dimensions may represent error rate, access speed, and yield for disk head assemblies. Each axis in the n-dimensional space 100 of FIG. 3 represents the scale for a dimension. As described above, the data mining program 54 has defined a normal subset 102 based on performance data 80 received from the input means 60 plotted against each axis. At locations 104 in the n-dimensional space 200, a plurality of performance parameters 20 are separated from the normal subset 102. The data mining program 54 has further defined other normal subsets 106 in the n-dimensional space 100 with performance parameters that are separated from the normal subset 102.

With reference back to FIG. 2, a notification system 70 causes persons to be notified when either a performance parameter 20 (location 104 in FIG. 3) is excluded from the normal subset 102, or a new normal subset 106 (locations 106 in FIG. 3) is found by the data mining program 54. When the system requires reporting to users, a personnel notification identification database (PNID) 72 is consulted. In the embodiment of FIG. 2, the PNID 72 comprises a plurality of PNID parameter records 20a that each match up to one of the parameter records 20 in the data warehouse 57. If a manufacturing parameter 20 is identified as being excluded from the normal subset 102, or a second normal subset 106 is identified and defined by the data mining program 54, then the system matches all of the identified manufacturing parameters 20 with the corresponding PNID parameter records 20a in the PNID 72.

The PNID 72 further contains personnel records 76. The personnel records 76 each identify one or more persons to be notified when one or more PNID parameter records 20a are matched with the identified manufacturing parameters 20. The PNID parameter records 20a are related to the personnel records 76 through a relational means 78 such as that described above with respect to relational means 58.

A notification method database (NMD) 82 within the notification system 70 is next consulted to determine the method 700 by which each person identified by each personnel record 76 should be notified. The NMD 82 contains notification method personnel records (NMPRs) 76a stored therein which are readily matched with the personnel records 76 of the PNID 72. Each NMPR 76a is related with at least one of a plurality of method records 702a-708a through a relational means 88 such as that described above with respect to relational means 58 above. Each method record 702a-708a designates a method of notification 700 which the notification system 72 acts upon to provide notification to personnel. For each person who is to be notified, as indicated by matching the personnel records 76 that are related to PNID parameter records 20a that are matched with identified manufacturing records 20, the related method records 702a-708a indicate to the notification system 70 how each person should be notified. In the embodiment of FIG. 2, method record 702a indicates that electronic mail 702 should be used to notify the specified person, method record 704a indicates that voice mail 704 should be provided, method record 706a indicates that a page 706 should be issued and method record 708a indicates that a person should be notified by cell or wireless phone 708.

The above described actions of the notification system 82 may be executed by a combination of hardware in conjunction with a notification program 84. A personal computer with an RDBMS stored therein may comprise the notification system 70.

Figure 4:
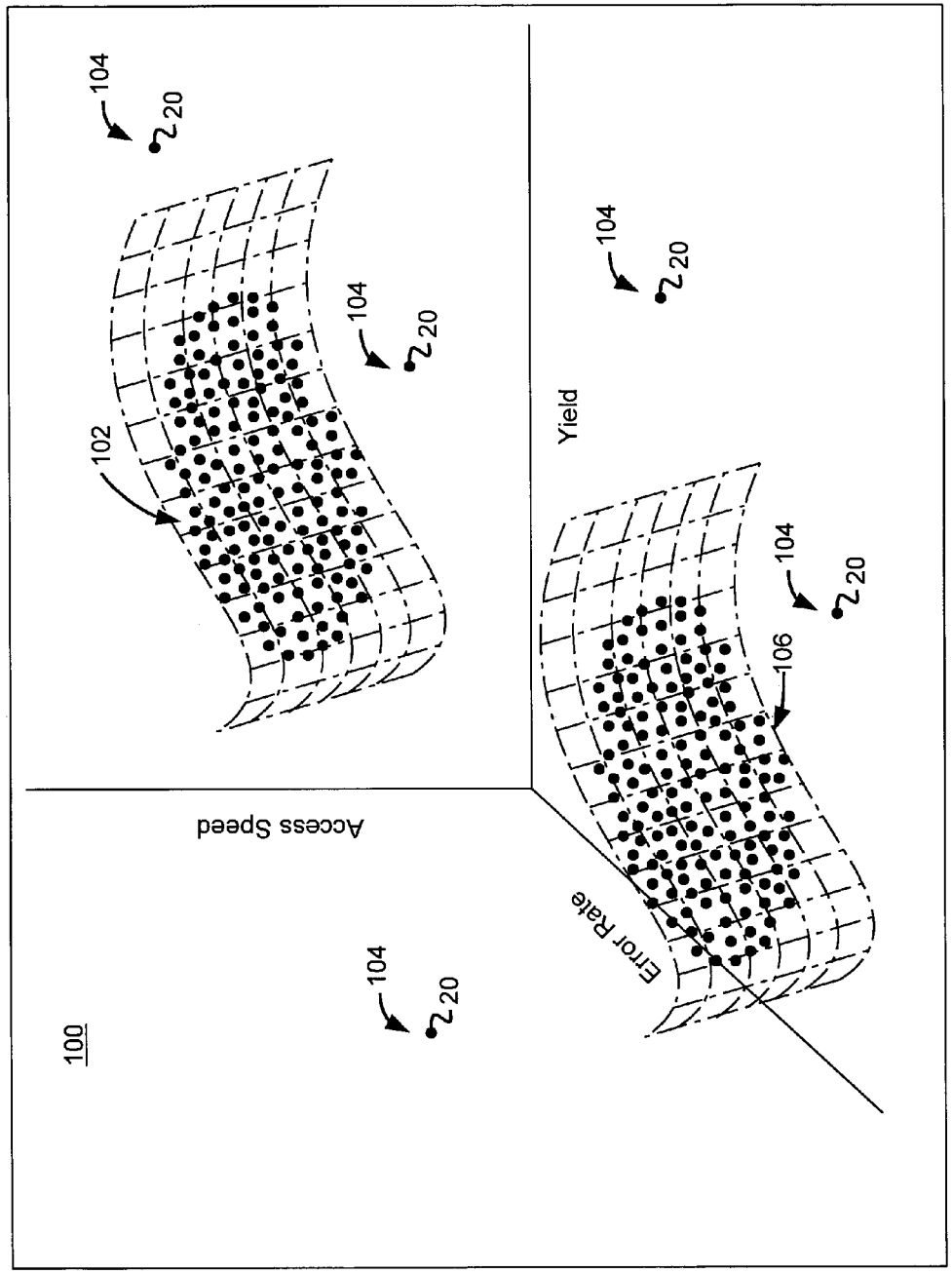
FIG. 4 is a simplified n-dimensional space plot alternative to that shown in FIG. 3.

With reference to FIG. 4, another embodiment of a simplified plot of manufacturing parameters 20 in n-dimensional space 100 based on product performance produced by the data mining program 54 of the method of FIG. 1 and system of FIG. 2 is shown. For the n-dimensional space 100 of FIG. 3, n=3 in order to simplify the diagram for illustrative purposes. As with the n-dimensional space 100 of FIG. 3, the dimensions may represent error rate, access speed, and yield for disk head assemblies. Each axis in the n-dimensional space 100 of FIG. 3 represents the scale for a dimension. The data mining program 54 has defined a normal subset 102 based on performance data 80 received from the input means 60 plotted against each axis. However, in FIG. 3, the normal subset 102 forms a surface instead of a cluster. At locations 104 in the n-dimensional space 100, a plurality of performance parameters 20 are separated from the normal subset 102 surface. The data mining program 54 has further defined other normal subset 106 surfaces in the n-dimensional space 100 with performance parameters that are separated from the normal subset 102 surface.

Figure 5:
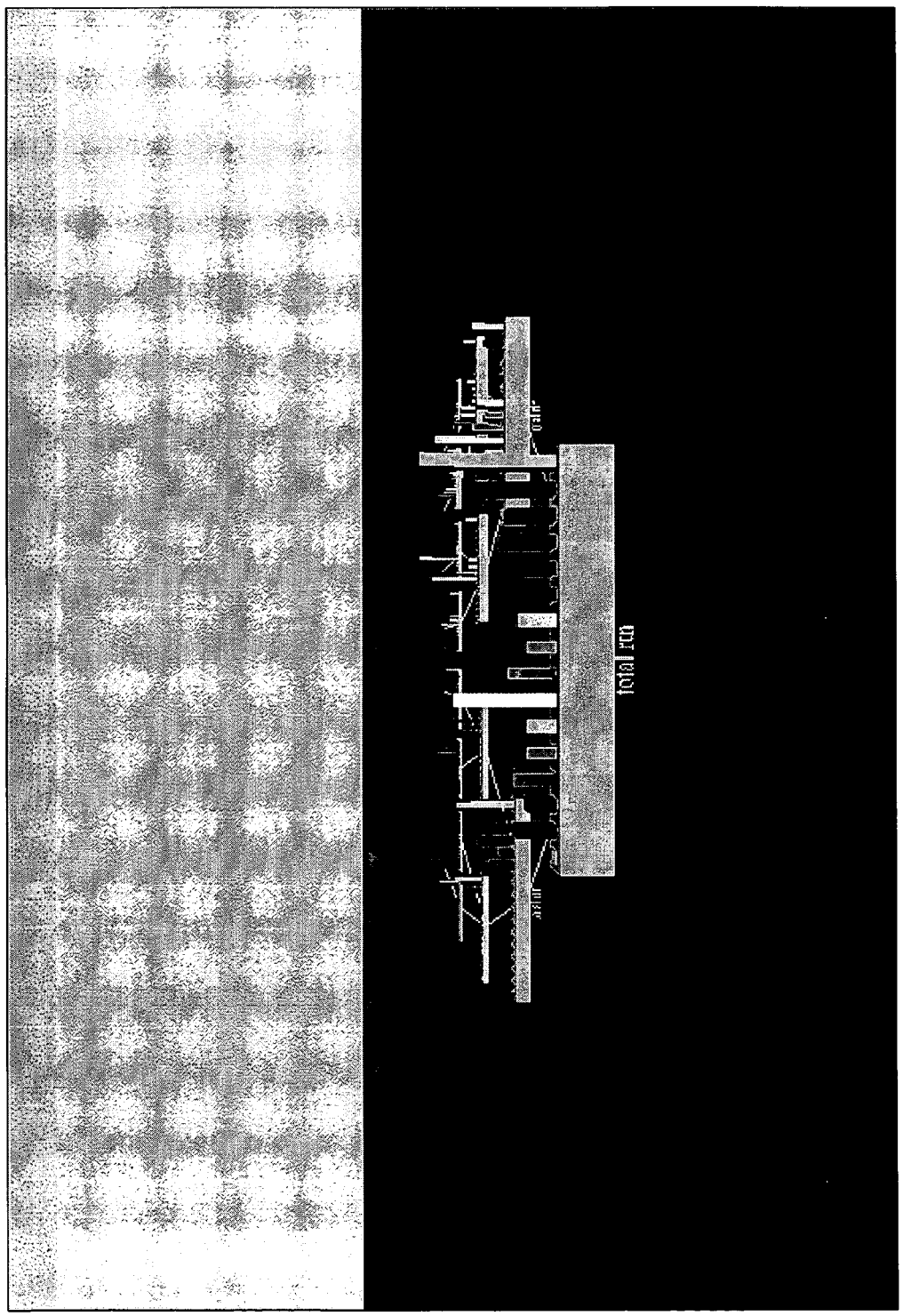
FIGS. 5-6 are visual representations of one of the methodologies used in the overall categorization performed by the data mining program of FIG. 2.
Figure 6:
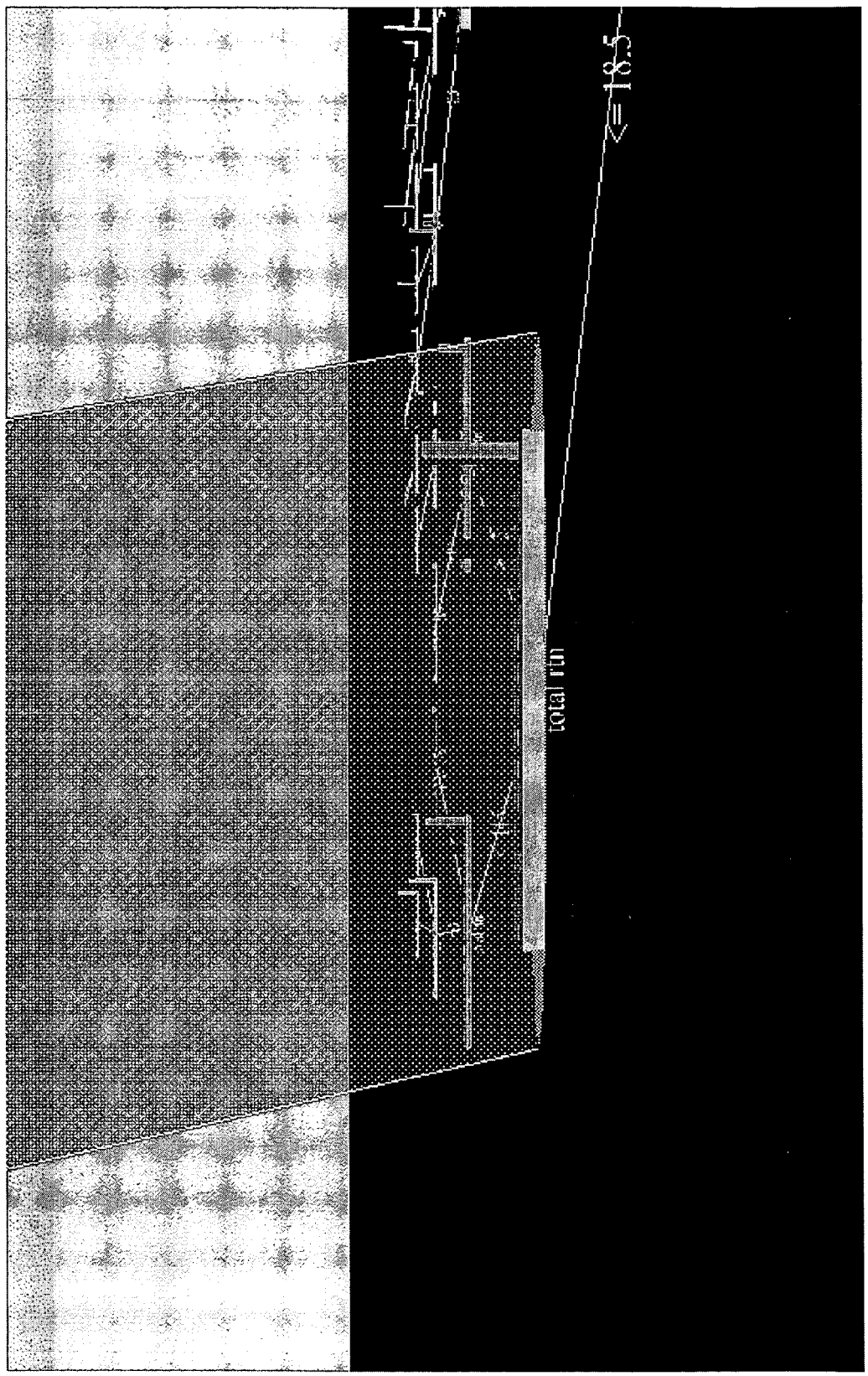

FIG. 5 is a visual representation of one of the methodologies used in the overall categorization performed by the data mining program 54 to determine normal and abnormal subsets. This particular form of the data mining program 54 presents a categorization that is called a decision tree because of branching that takes place to categorize and subset groups of the manufacturing parameters 20. A base root node of the tree (barplot at the front in FIG. 5) shows the response variable (e.g., yield) plotted by quantity within bins (e.g, number of products with yields from 0-5%, 5-10%, . . . 95-100%). At the base of this root node, the data mining program 54 lists a most significant manufacturing parameter (in the n dimensional space 100) for grouping the yield into distinct (non overlapping) groups (similar to groups 102 and 106 in FIG. 4). The conditions applied for the grouping are published by the data mining program 54 (e.g., total product returns<=18 for the left branch, total returns>18 for the right branch)—and are shown in FIG. 6 for one of the branches. FIG. 6 also shows the distribution of a subset (note this subset consists strictly of high valued devices—no low valued ones are present).

This process is repeated for each subset until the data mining program determines 54 that no statistically significant improvement in segregation can be made. Thus in terms of FIG. 4, there would essentially be 7 terminal nodes representing groups 102, 106 and up to 5 individual nodes representing the independent outliers represented by 104 in FIG. 4.

Figure 7:
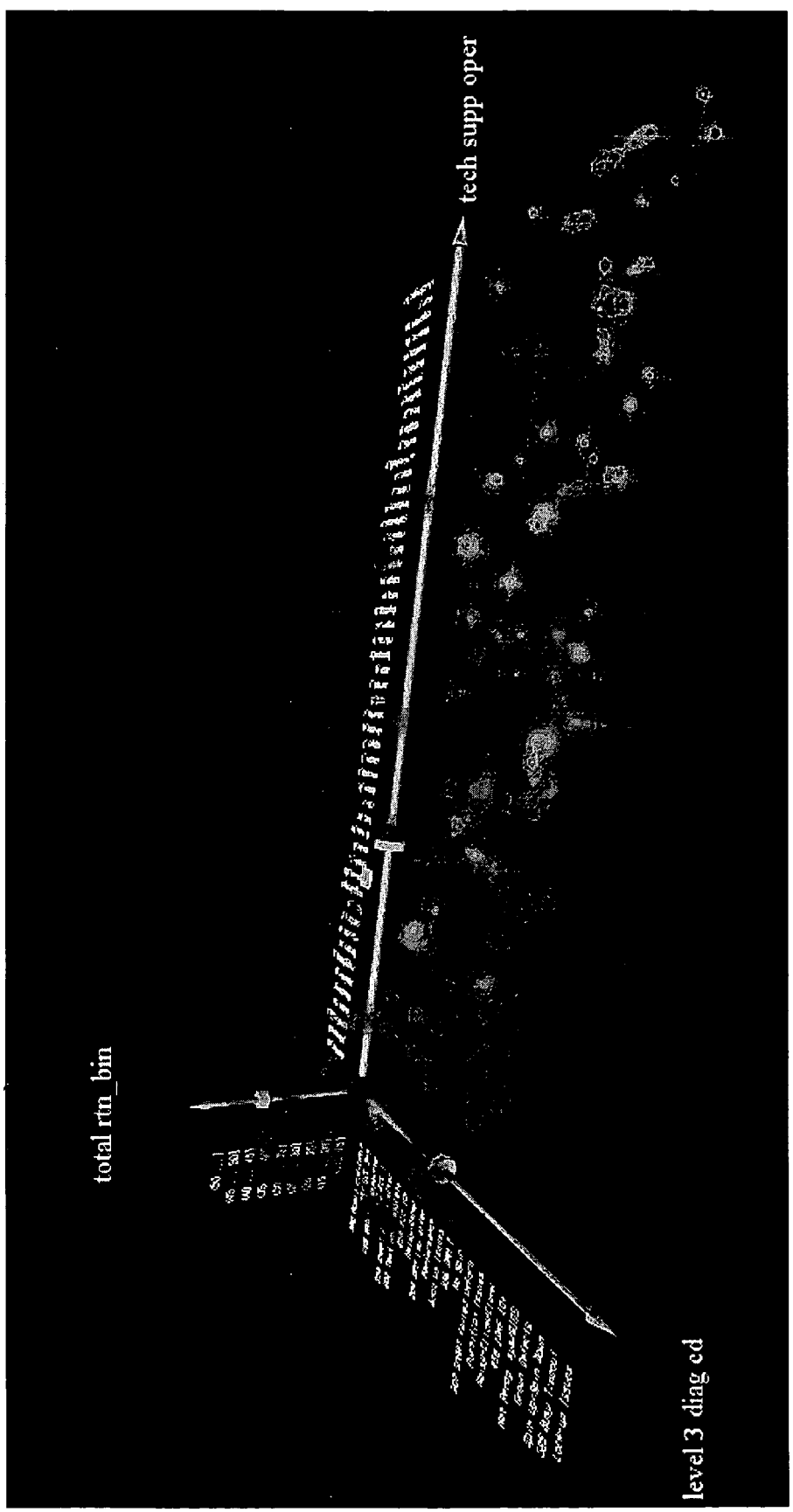
FIG. 7 is an output from another visualization tool of the data mining program 54 similar to that illustrated in FIG. 4.

FIG. 7 is an output from another visualization tool of the data mining program 54 similar to that illustrated in FIG. 4. The plot in FIG. 7 illustrates up to 5 dimensions by varying the x,y,z positions, the color of the clusters, or balls, and the opacity of the balls. In addition the size of the balls is proportional to the quantity of units in each subset 102, 106. This visualization tool may be used by the investigator to verify the statistical groupings made by the data mining program 54 like in FIG. 4.

What is claimed is:

1. A method for identifying manufacturing anomalies in a manufacturing system comprising a plurality of products which are manufactured with a plurality of manufacturing parameters, the method comprising the steps of
   storing the plurality of manufacturing parameters in a data warehouse;
   applying a data mining program to perform the steps of:
   analyzing the stored manufacturing parameters to define a first normal subset, said first normal subset comprising a subset of said plurality of manufacturing parameters of products which show similar performance ratings;
   comparing manufacturing parameters associated with at least one product with the manufacturing parameters contained within said first normal subset;
   detecting at least one manufacturing parameter associated with said at least one product that is excluded from the first normal subset; and
   reporting the at least one detected manufacturing parameter.

2. The method of claim 1, wherein the step of applying the data mining program comprises detecting that a plurality of the manufacturing parameters associated with said at least one product are excluded from the first normal subset.

3. The method of claim 2, wherein the step of applying the data mining program further comprises analyzing the detected plurality of manufacturing parameters to define a second normal subset of the detected plurality of manufacturing parameters.

4. The method of claim 3, comprising reporting the second normal subset of manufacturing parameters.

5. The method of claim 4, wherein the first normal subset of manufacturing parameters is defined by categorizing the manufacturing parameters in an n-dimensional space.

6. The method of claim 5, wherein the second normal subset of manufacturing parameters is defined by categorizing the manufacturing parameters excluded from the first normal subset in the n-dimensional space using the data mining program.

7. A system for identifying manufacturing anomalies in a manufacturing system comprising a plurality of products which are manufactured with a plurality of manufacturing parameters, comprising:
   a data warehouse for storing the plurality of manufacturing parameters;
   a data mining program applied to the data warehouse for analyzing the stored manufacturing parameters to define a first normal subset, said first normal subset comprising a subset of said plurality of manufacturing parameters of products which show similar performance ratings, comparing manufacturing parameters associated with at least one product with the manufacturing parameters contained within said first normal subset, and detecting at least one manufacturing parameter associated with said at least one product that is excluded from the first normal subset; and
   a reporting means for reporting the at least one detected manufacturing parameter.

8. The system of claim 7, wherein the data mining program is for detecting that a plurality of the manufacturing parameters associated with said at least one product are excluded from the first subset.

9. The system of claim 8, wherein the data mining program is further for analyzing the detected plurality of manufacturing parameters to define a second normal subset of the detected plurality of manufacturing parameters.

10. The method of claim 9, wherein the reporting means is for reporting the second normal subset of manufacturing parameters.

11. The system of claim 10, wherein the data mining program is for defining the first normal subset of manufacturing parameters by categorizing the manufacturing parameters in an n-dimensional space.

12. The system of claim 11, wherein the data mining program is for defining the second normal subset of manufacturing parameters by categorizing the manufacturing parameters excluded from the first normal subset in the n-dimensional space.

* * * * *